(12) United States Patent
Hosobe et al.

(10) Patent No.: US 9,185,647 B2
(45) Date of Patent: Nov. 10, 2015

(54) HNB GATEWAY DEVICE, FEMTOCELL SYSTEM, AND METHOD OF OPERATING HNB-GW USED FOR SAME WITH REDUCED ELECTRIC POWER

(75) Inventors: Hideumi Hosobe, Tokyo (JP); Masato Shindo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 13/980,173

(22) PCT Filed: Mar. 16, 2012

(86) PCT No.: PCT/JP2012/001864
§ 371 (c)(1),
(2), (4) Date: Jul. 17, 2013

(87) PCT Pub. No.: WO2012/127840
PCT Pub. Date: Sep. 27, 2012

(65) Prior Publication Data
US 2013/0295932 A1    Nov. 7, 2013

(30) Foreign Application Priority Data
Mar. 23, 2011    (JP) ................................ 2011-063458

(51) Int. Cl.
*H04W 4/00* (2009.01)
*H04W 52/02* (2009.01)
*H04W 76/04* (2009.01)
(Continued)

(52) U.S. Cl.
CPC ...... *H04W 52/0206* (2013.01); *H04W 52/0274* (2013.01); *H04W 76/046* (2013.01); *H04W 76/068* (2013.01); *H04W 84/045* (2013.01); *Y02B 60/50* (2013.01)

(58) Field of Classification Search
None
See application file for complete search history.

(56) References Cited

U.S. PATENT DOCUMENTS

2009/0262682 A1 * 10/2009 Khetawat et al. ............ 370/328
2010/0056184 A1    3/2010 Vakil et al.
(Continued)

FOREIGN PATENT DOCUMENTS

EP    2056628 A1    5/2009
JP    2010-10919 A    1/2010
(Continued)

OTHER PUBLICATIONS

Communication dated Sep. 2, 2014, from the European Patent Office in counterpart European Application No. 12760341.3.
(Continued)

*Primary Examiner* — Marivelisse Santiago Cordero
*Assistant Examiner* — Temitayo Folayan
(74) *Attorney, Agent, or Firm* — Sughrue Mion, PLLC

(57) ABSTRACT

Provided is an HNB gateway device capable of, while in an operation in a sleep mode, deactivating function units other than functions units associated with a mode check message and a sleep mode release request message from another HNB-GW, and thereby enabling a power saving operation. An HNB gateway device (2) includes a function to obtain a usage rate of the HNB gateway device, relays signals between a switching center and an HNB, and transits to a sleep mode when the usage rate reaches or falls below a predetermined value. The HNB gateway device includes means (HNB-GW list management unit 23) for changing, upon transition to the sleep mode, an HNB gateway list in the HNB performing HNB registration on the HNB gateway device using RPC:SetParameterValues from an HMS.

6 Claims, 13 Drawing Sheets

(51) Int. Cl.
*H04W 76/06* (2009.01)
*H04W 84/04* (2009.01)

(56) References Cited

U.S. PATENT DOCUMENTS

2010/0184432 A1    7/2010  Yano et al.
2011/0077029 A1*   3/2011  Okuda .................... 455/456.4

FOREIGN PATENT DOCUMENTS

| JP | 2010-171714 A | 8/2010 |
| JP | 2010-268230 A | 11/2010 |
| WO | 2010151186 A1 | 12/2010 |

OTHER PUBLICATIONS

Ashraf, Imran et al., "Power Savings in Small Cell Deployments via Sleep Mode Techniques", 2010 IEEE 21st International Symposium on Personal, Indoor and Mobile Radio Communications Workshops (PIMRC WORKSHOPS); Sep. 26-30, 2010, Istanbul, Turkey, IEEE, Piscataway, NJ, USA, Sep. 26, 2010, pp. 307-311.

3GPP TS 25.467 V8.5.0, 3rd Generation Partnership Project; Technical Specification Group Radio Access Network; UTRAN architecture for 3G Home Node B (HNB); Stage 2 (Release 8), Mar. 2010, pp. 1-25.

Broadband forum, Technical Report, TR-069, "CPE WAN Management Protocol v1.1", Dec. 2007, pp. 1-138.

Broadband forum, Technical Report, TR-196, "Femto Access Point Service Data Model" Issue 1, Apr. 2009, pp. 1-131.

* cited by examiner

HNB LIST IN HNB-GW2

HNB41
HNB42
⋮
HNB4x

Fig. 4

UE LIST IN HNB-GW2

HNB GATEWAY DEVICE, FEMTOCELL SYSTEM, AND METHOD OF OPERATING HNB-GW USED FOR SAME WITH REDUCED ELECTRIC POWER

CROSS REFERENCE TO RELATED APPLICATIONS

This application is a National Stage of International Application No. PCT/JP2012/001864, filed on Mar. 16, 2012, which claims priority from Japanese Patent Application No. 2011-063458, filed on Mar. 23, 2011, the contents of all of which are incorporated herein by reference in their entirety.

TECHNICAL FIELD

The present invention relates to an HNB gateway device, a femtocell system, and a method of operating an HNB-GW used for same with reduced electric power, and particularly to a power saving operation of an HNB (Home Node B)-GW (Gateway) that forms a femtocell system.

BACKGROUND ART

Since an HNB (Home Node B) forming the above femtocell system is installed in an ordinary household and an office, a usage rate of the HNB and an HNB-GW is low depending on the time of day. Although there are various research for a method of operating the HNB with reduced electric power, research is still required for a method of operating the HNB-GW with reduced electric power.

The femtocell system related to the present invention includes the HNB, the HNB-GW, and an HMS (Home Node B Management System). The HNB is a small-scale base station installed in homes and offices, and is also referred to as an FAP (Femto Access Point). The HNB-GW is a device that relays signals between a switching center and the HNB.

The HMS (Home Node B Management System) is equipped with a function for managing configuration information of the HNB such as a list of HNB-GWs capable of accepting HNB Registration from the HNB.

In regard to the above operation of HNB-GW with reduced electric power, there are techniques (e.g. patent literatures 1 and 2) for transitioning to a power saving state or an operating state depending on a server load and an accommodating status of mobile terminals. The technique disclosed in patent literature 1 deletes an entry from an MME pool held to an eNodeB before MME (MME) transitions to a power saving mode.

Note that a UE (User Equipment) Registration number is used as an index representing the usage rate of HNB-GW that is used in the method of operating the HNB-GW with reduced electric power. The UE Registration is a standard operation defined in following non patent literature 1.

In order for the HNB-GW to obtain or change a list of HNB-GWs capable of accepting the HNB Registration from the HNB, the HMS (Home Node B Management System) transmits to the HNB "RPC:Get Parameter Values" or "RPC:Set Parameter Values", and the HMS notifies the HNB-GW of the result.

Transmitting "RPC:Get Parameter Values" and "RPC:Set Parameter Values" from the HMS to the HNB is a standard operation defined in non patent literature 2.

The HNB is equipped with a function to hold a "list of HNB-GWs capable of accepting the HNB Registration from the corresponding HNB". Generally, as described in "FAPG-WServer1", "FAPGWServer2", and "FAPGWServer3" in following non patent literature 3, multiple HNB-GWs can be specified to the "list of HNB-GWs".

CITATION LIST

Patent Literature

Patent literature 1: Japanese Unexamined Patent Application Publication No. 2010-171714
Patent literature 2: Japanese Unexamined Patent Application Publication No. 2010-010919

Non Patent Literature

Non patent literature 1: 3GPP TS 25.467, "UTRAN architecture for 3G Home Node B (HNB)", V8.5.0 (2010-March)
Non patent literature 2: broadband forum, TR-069, "CPE WAN Management Protocol v1.1"
Non patent literature 3: broadband forum, TR-196, "Femto Access Point Service Device Model", Issue: 1

SUMMARY OF INVENTION

Technical Problem

In the above method of operating the HNB-GW with reduced electric power, as the HNB is installed in an ordinary household and an office, the usage rate of HNB and HNB-GW is low depending on the time of day. Therefore, research is needed also for the method of realizing the operation of the HNB-GW with reduced electric power depending on the usage rate of HNB-GW.

In this regard, an objective of the present invention is to solve the above problem and to provide an HNB gateway device that is capable of deactivating function units other than function units associated with a "mode check" message and a "sleep mode release request" message from another HNB-GW during an operation in a sleep mode, a femtocell system, and a method of operating the HNB-GW used for same with reduced electric power.

Solution to Problem

An HNB (Home Node B) gateway device according to the present invention including a function to obtain a usage rate of the HNB gateway device, relaying signals between a switching center and an HNB, and transitioning to a sleep mode when the usage rate of the HNB gateway device reaches or falls below a predetermined value. The HNB gateway device includes means for changing, upon transition to the sleep mode, an HNB gateway list in the HNB performing HNB registration on the HNB gateway device using RPC:SetParameterValues from an HMS (Home Node B Management System).

A femtocell system according to the present invention is characterized by including the above HNB gateway device.

A method of operating an HNB (Home Node B) gateway device with reduced electric power according to the present invention is for the HNB gateway device including a function to obtain a usage rate of the HNB gateway device, relaying signals between a switching center and an HNB, and transitioning to a sleep mode when the usage rate of the HNB gateway device reaches or falls below a predetermined value. The method includes executing a process to change, upon transition to the sleep mode, an HNB gateway list in the HNB performing HNB registration on the HNB gateway device using RPC:SetParameterValues from an HMS (Home Node B Management System).

Advantageous Effects of Invention

With the above configuration and operation, the present invention is able to achieve an exemplary advantage of deactivating function units other than function units associated with a "mode check" message and a "sleep mode release request" message from another HNB-GW during an operation in the sleep mode, and thereby enabling power saving operation.

BRIEF DESCRIPTION OF DRAWINGS

FIG. 4 is a diagram showing an example of an HNB list managed by an HNB list management unit shown in FIG. 1;

FIG. 5 is a diagram showing an example of a UE list managed by a UE list management unit shown in FIG. 1;

DESCRIPTION OF EMBODIMENTS

Next, exemplary embodiments of the present invention will be explained with reference to the drawings. First, following is an explanation for a method of operating an HNB-GW (Home Node B Gateway) (HNB gateway device) with reduced electric power according to the present invention.

The method of operating the HNB-GW with reduced electric power according to the present invention is characterized by enabling the HNB-GW with a low usage rate to transition to a sleep mode. When the HNB-GW is operating in the sleep mode, the HNB-GW deactivates functions other than functions required for releasing the sleep mode.

A UE (User Equipment) Registration number is used as an index representing the usage rate of the HNB-GW. Since UE Registration is a standard operation defined in the above non patent literature 1, the present invention can be realized without involving a change in a UE and HNB (Home Node B).

In order for the HNB-GW to obtain or change a list of HNB-GWs capable of accepting the HNB Registration from the HNB, an HMS (Home Node B Management System) transmits "RPC:Get Parameter Values" or "RPC:Set Parameter Values" to the HNB, and the HMS notifies the HNB-GW of the result.

Transmitting "RPC:Get Parameter Values" and "RPC:Set Parameter Values" from the HMS to the HNB is a standard operation defined in above non patent literature 2. Thus the present invention can be realized without involving a change in the HNB.

As stated above, the present invention enables a power saving operation of the HNB-GW by defining an index that indicates the usage rate of the HNB-GW and transitioning the HNB-GW to the sleep mode when the usage rate falls.

Figure 1:
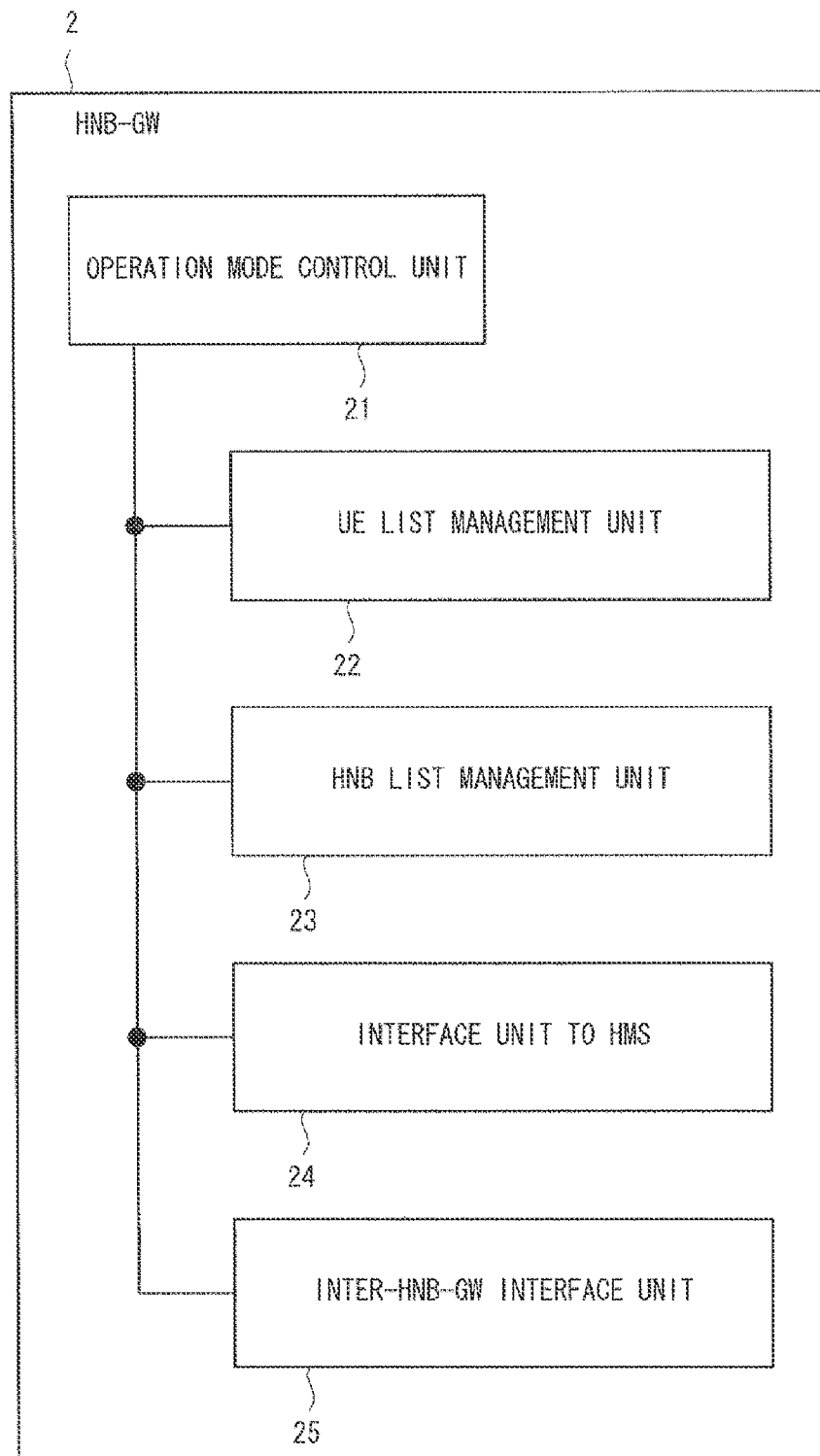
FIG. 1 is a block diagram showing a configuration example of an HNB-GW according to a first exemplary embodiment of the present invention.
Figure 2:
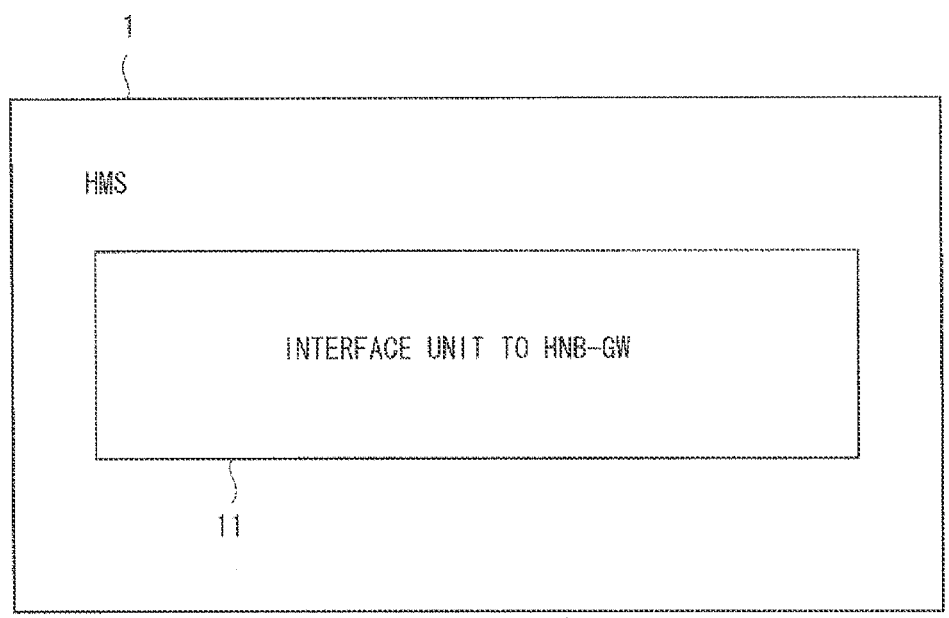
FIG. 2 is a block diagram showing a configuration example of an HMS according to the first exemplary embodiment of the present invention.
Figure 3:
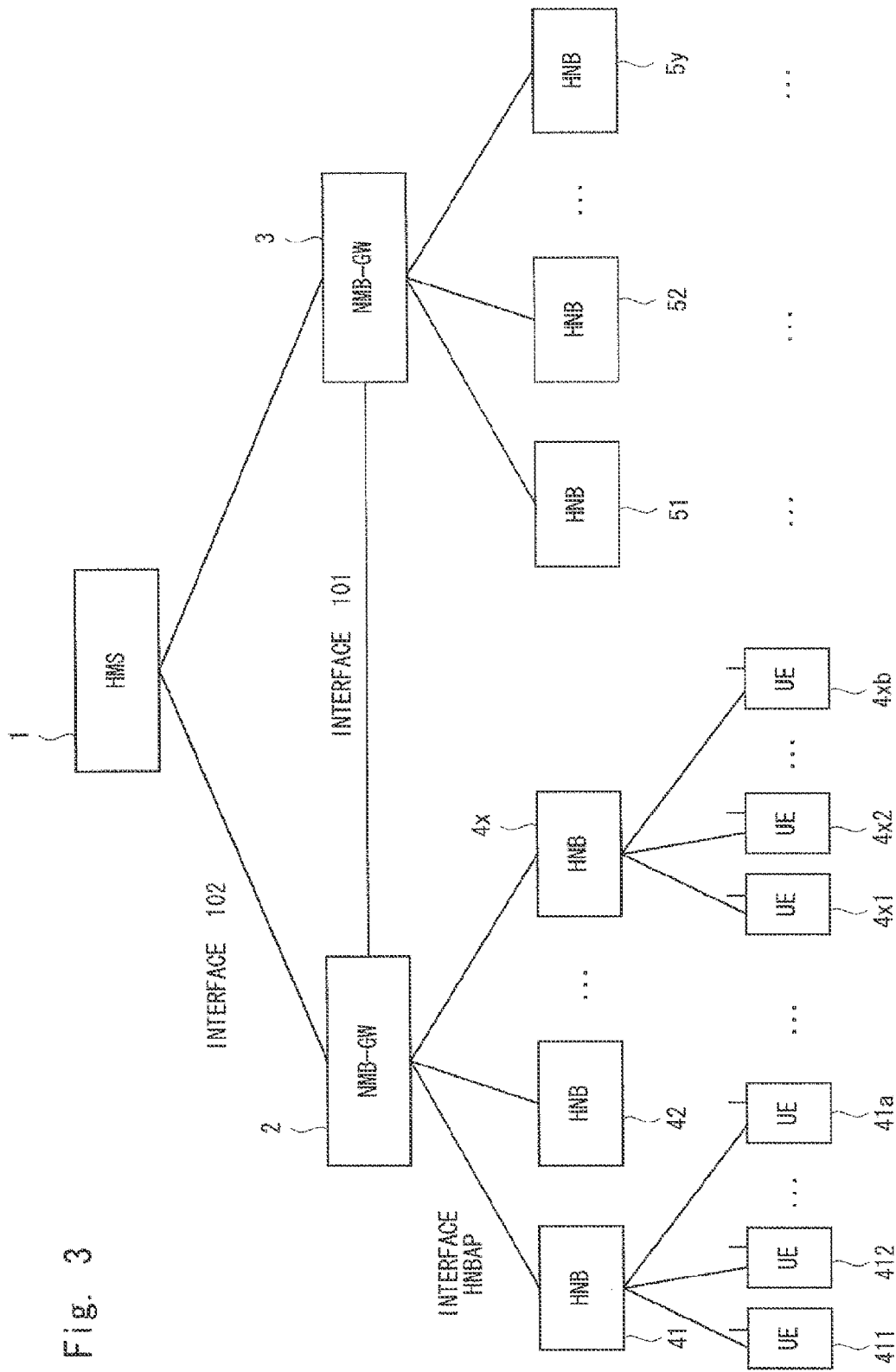
FIG. 3 is a block diagram showing a configuration example of a femtocell system according to the first exemplary embodiment of the present invention.

FIG. 1 is a block diagram showing a configuration example of the HNB-GW according to the first exemplary embodiment of the present invention, FIG. 2 is a block diagram showing a configuration example of the HMS according to the first exemplary embodiment of the present invention, and FIG. 3 is a block diagram showing a configuration example of a femtocell system according to the first exemplary embodiment of the present invention.

In FIG. 3, the femtocell system according to the first exemplary embodiment of the present invention includes an HMS 1, HNB-GWs 2 and 3, HNBs 41-4x and 51-5y (x and y are positive integers), and UEs 411 to 41a, . . . , 4x1 to 4xb, . . . (a and b are positive integers).

The UEs 411 to 41a, . . . , 4x1 to 4xb, and . . . are mobile phone terminals. The HNBs 41-4x and 51-5y are the small-scale base stations as the ones installed in homes and offices, and may be referred to as FAPs (Femto Access Points).

The HNB-GW 2 and 3 are devices that perform relay between the switching center (not shown), which is used in the abovementioned mobile communication method related to the present invention, and the HNBs 41-4x and 51-5y. The HMS 1 is equipped with a function to manage configuration information of the HNBs 41-4x and 51-5y such as an "HNB-GW list" (described later).

The HNBs 41-4x and 51-5y are equipped with a function to hold a "list of HNB-GWs capable of accepting the HNB Registration from the corresponding HNB" (hereinafter referred to as the "HNB-GW list"). Generally, as described in "FAPGW Server1", "FAPGW Server2", and "FAPGW Server3" in above non patent literature 3, multiple HNB-GWs 2 and 3 can be specified to the "HNB-GW list".

In FIG. 1, the HNB-GW 2 includes an operation mode control unit 21, a UE list management unit 22, an HNB list management unit 23, an interface unit to HMS 24, and an inter-HNB-GW interface unit 25. Note that although not shown, the HNB-GW 3 has a similar configuration as the HNB-GW 2 and includes an operation mode control unit 31, a UE list management unit 32, an HNB list management unit 33, an interface unit to HMS 34, and an inter-HNB-GW interface unit 35. Moreover, the units forming the HNB-GW 3 operate in a similar manner as the respective units forming the HNB-GW 2.

The operation mode control unit 21 controls the operation mode of the HNB-GW 2. The UE list management unit 22 manages UEs that are registered on the corresponding HNB-GW in the UE Registration (hereinafter referred to as a "UE list", and the number of UEs included in the "UE list" is referred to as a "UE Registration number").

The HNB list management unit 23 manages a list of HNBs that are registered on the corresponding HNB-GW in the HNB Registration (hereinafter referred to as an "HNB list").

The interface unit to HMS 24 is an interface via the HMS 1 (corresponding to an interface 102 of FIG. 3) that transmits an "HNB-GW list query request" message for obtaining the "HNB-GW list" of the HNBs 41-4x and 51-5y, receives an "HNB-GW list query response" message, transmits an "HNB-GW list change request" message for changing the "HNB-GW list" of the HNBs 41-4x and 51-5y via the HMS 1, and receives an "HNB-GW list change request response" message.

The inter-HNB-GW interface unit 25 is an interface to the other HNB-GW 3 (corresponding to an interface 101 of FIG. 3) that transmits and receives a "mode check" message for checking whether the HNB-GW is operating in the sleep mode or a normal mode, a "mode check response" message, a "sleep mode release request" message for requesting release of the sleep mode, and a "sleep mode release request response" message.

These interfaces are not standard interfaces in 3GPP (Third Generation Partnership Project) and the like but introduced by the present invention. There is no particular limitation in realizing these interfaces, and these interfaces can be realized as a higher-application layer of SCTP (Stream Control Transmission Protocol), for example.

In FIG. 2, the HMS 1 includes an interface unit to HNB-GW 11. The interface unit to HNB-GW 11 is an interface to the HNB-GWs 2 and 3 (corresponding to the interface 102 of FIG. 3) that receives the "HNB-GW list query request" message, transmits the "HNB-GW list query request response" message, receives the "HNB-GW list change request" message, and transmits the "HNB-GW list change request response" message.

In this exemplary embodiment, a femtocell system called 3G is used for explanation. However, the present invention can be applied to a different femtocell system without departing from the scope of the present invention. For example, the present invention can be applied to an LTE (Long Term Evolution) femtocell system called 3.9G.

Figure 4:
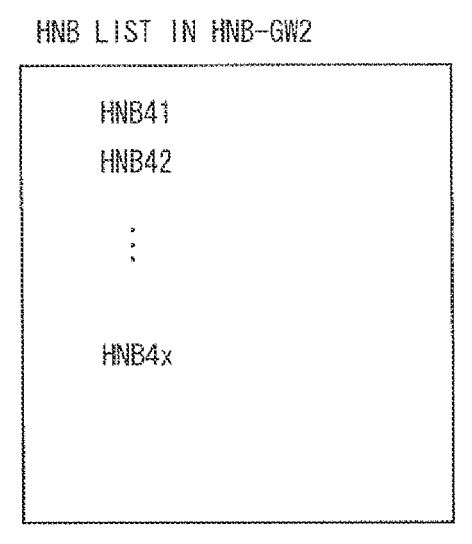

FIG. 4 is a diagram showing an example of the HNB list managed by the HNB list management unit 23 shown in FIG. 1, and FIG. 5 is a diagram showing an example of the UE list managed by the UE list management unit 22 shown in FIG. 1.

Figure 6:
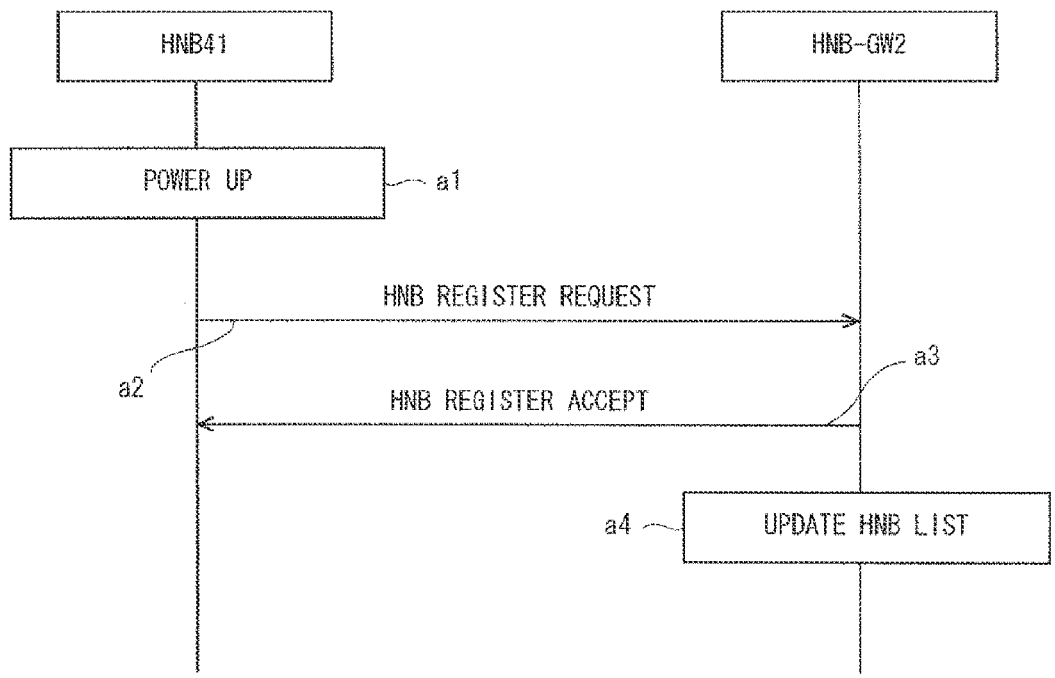
FIG. 6 is a sequence chart showing an HNB Registration sequence in the first exemplary embodiment of the present invention.
Figure 7:
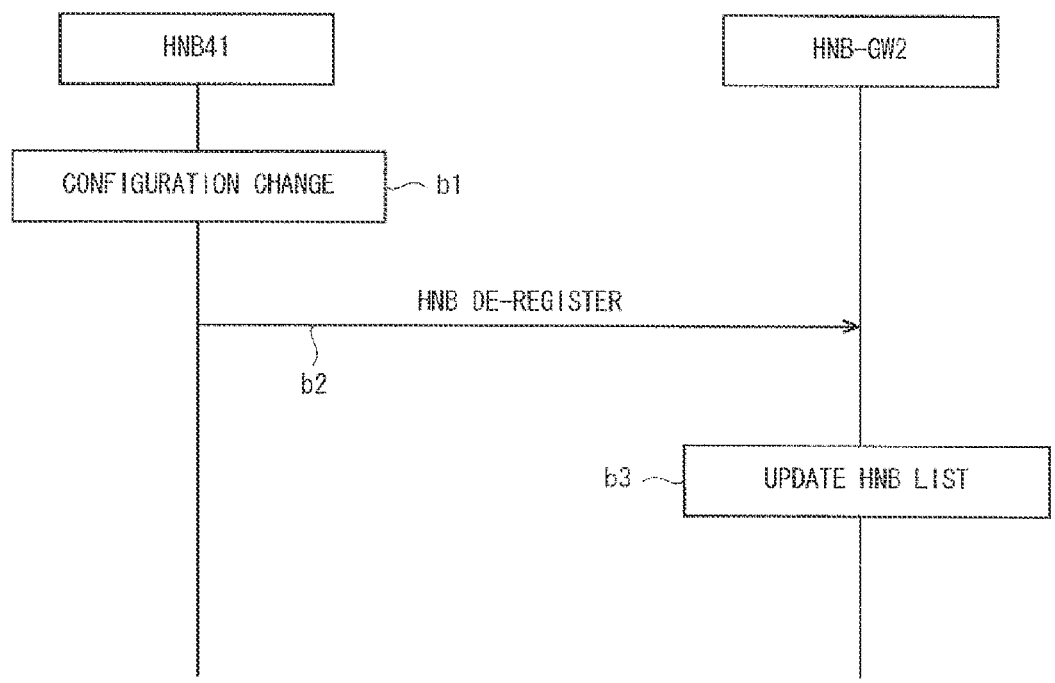
FIG. 7 is a sequence chart showing an HNB De-Registration (HNB oriented) sequence in the first exemplary embodiment of the present invention.

FIG. 6 is a sequence chart showing an HNB Registration sequence in the first exemplary embodiment of the present invention. FIG. 7 is a sequence chart showing an HNB De-Registration (HNB oriented) sequence in the first exemplary embodiment of the present invention.

Figure 8:
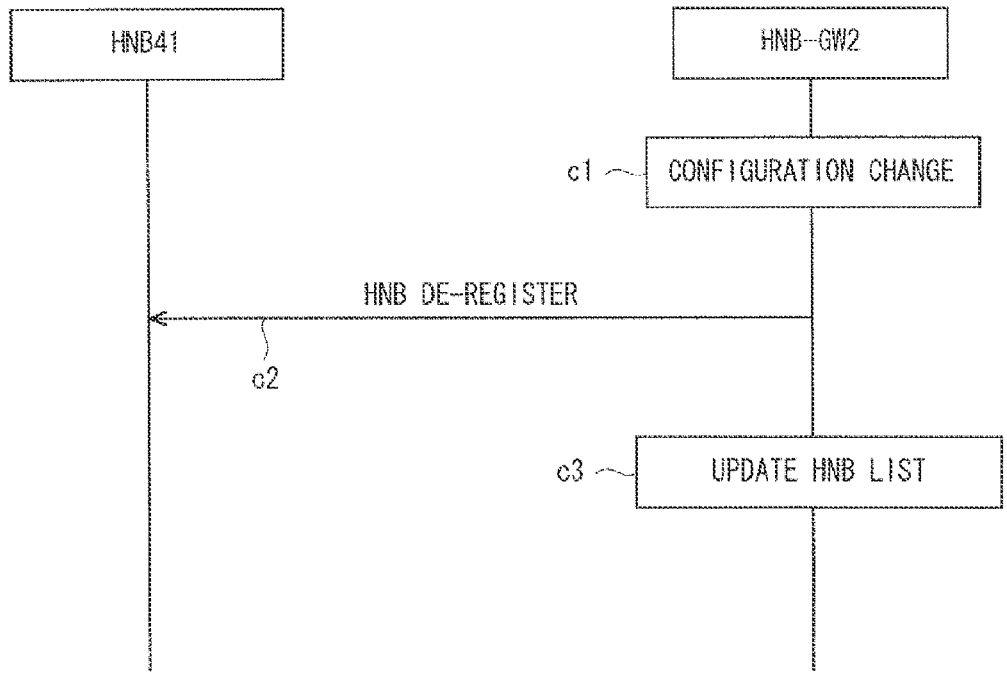
FIG. 8 is a sequence chart showing an HNB De-Registration (HNB-GW oriented) sequence in the first exemplary embodiment of the present invention.
Figure 9:
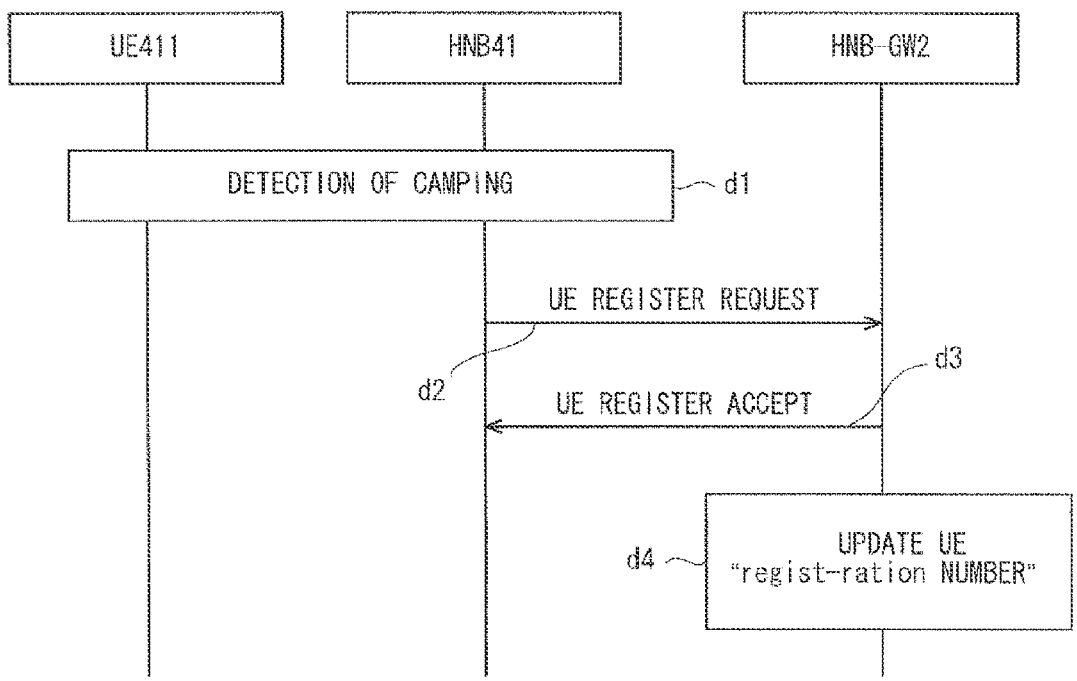
FIG. 9 is a sequence chart showing a UE Registration sequence in the first exemplary embodiment of the present invention.

FIG. 8 is a sequence chart showing an HNB De-Registration (HNB-GW oriented) sequence in the first exemplary embodiment of the present invention. FIG. 9 is a sequence chart showing an UE Registration sequence in the first exemplary embodiment of the present invention.

Figure 10:
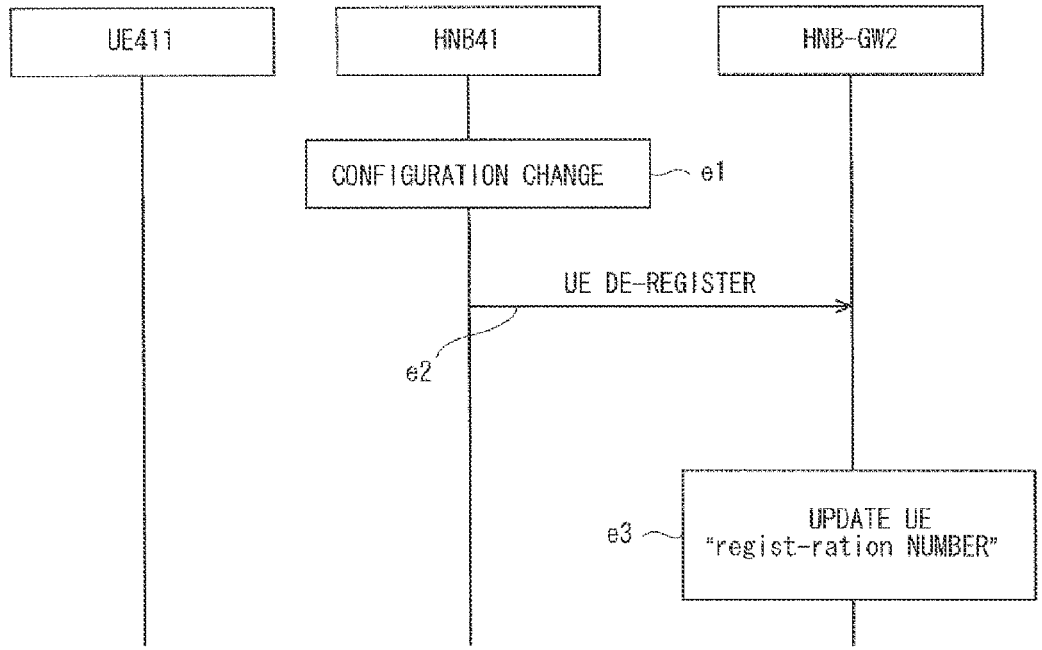
FIG. 10 is a sequence chart showing a UE De-Registration (HNB oriented) sequence in the first exemplary embodiment of the present invention.
Figure 11:
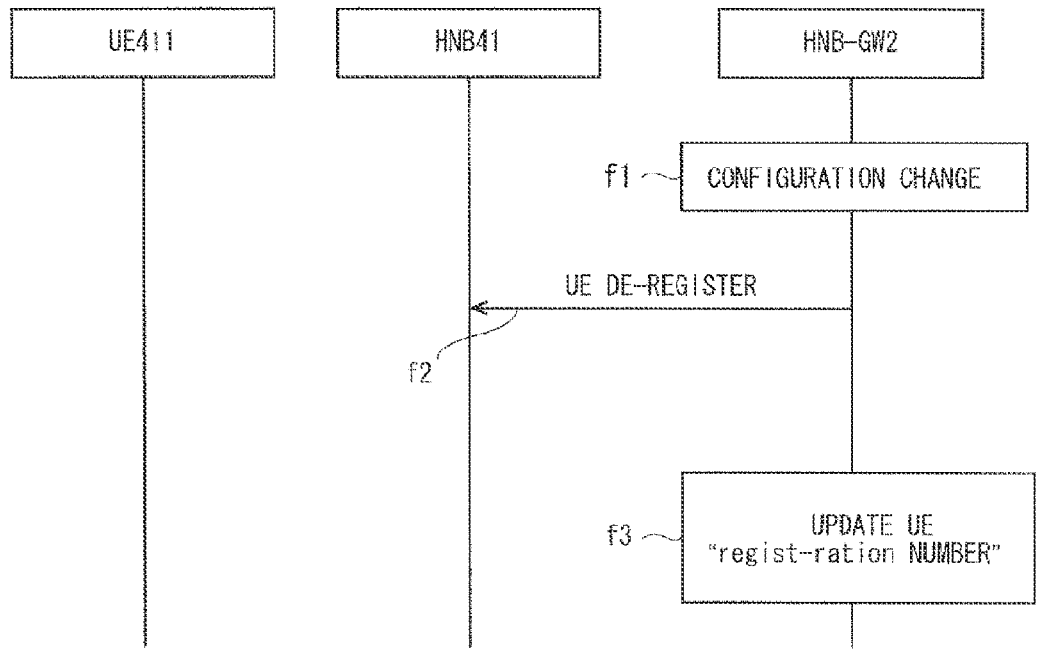
FIG. 11 is a sequence chart showing a UE De-Registration (HNB-GW oriented) sequence in the first exemplary embodiment of the present invention.

FIG. 10 is a sequence chart showing a UE De-Registration (HNB oriented) sequence in the first exemplary embodiment of the present invention. FIG. 11 is a sequence chart showing a UE De-Registration (HNB-GW oriented) sequence in the first exemplary embodiment of the present invention.

Figure 12:
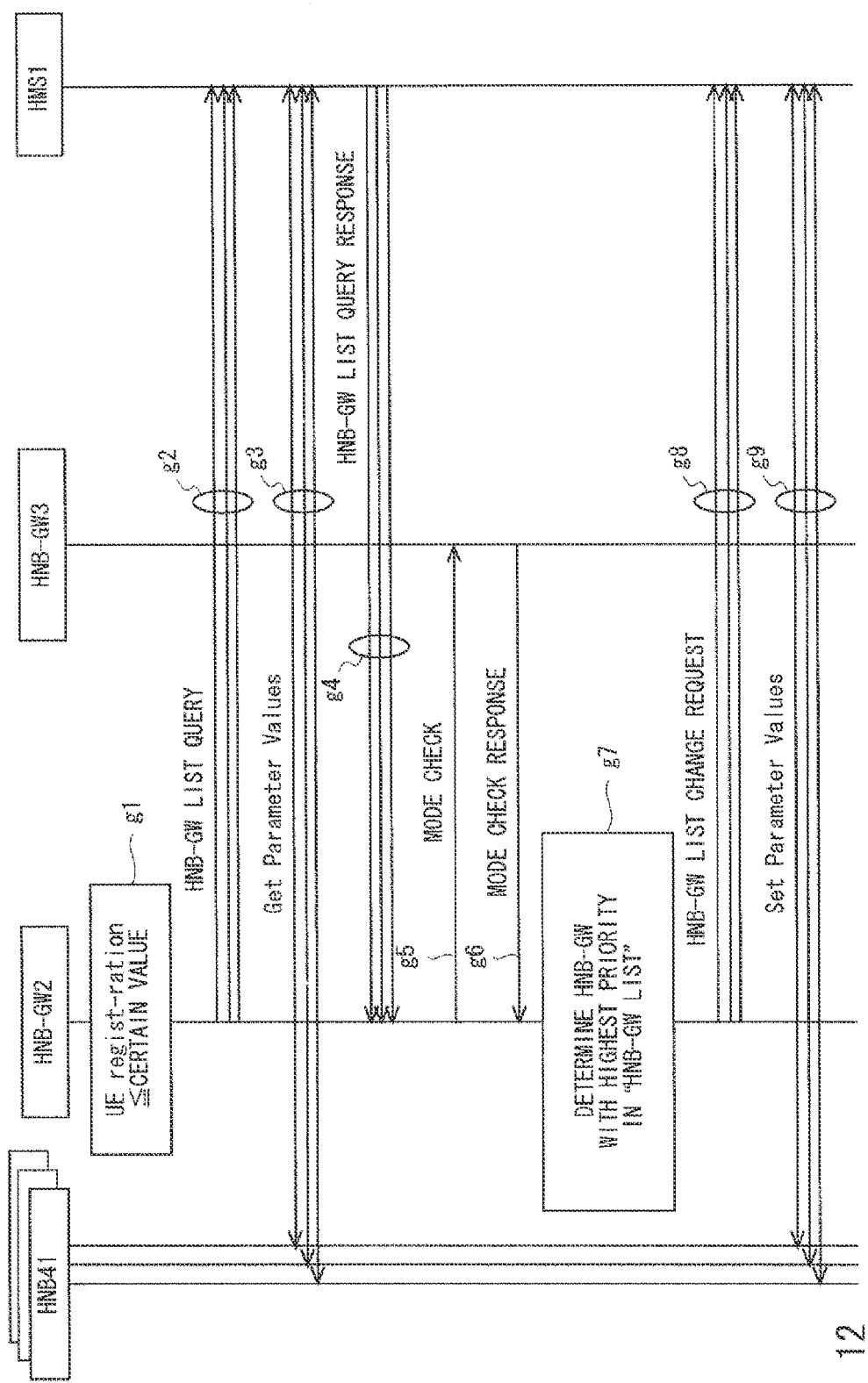
FIG. 12 is a sequence chart showing a transition sequence to a sleep mode in the first exemplary embodiment of the present invention.
Figure 13:
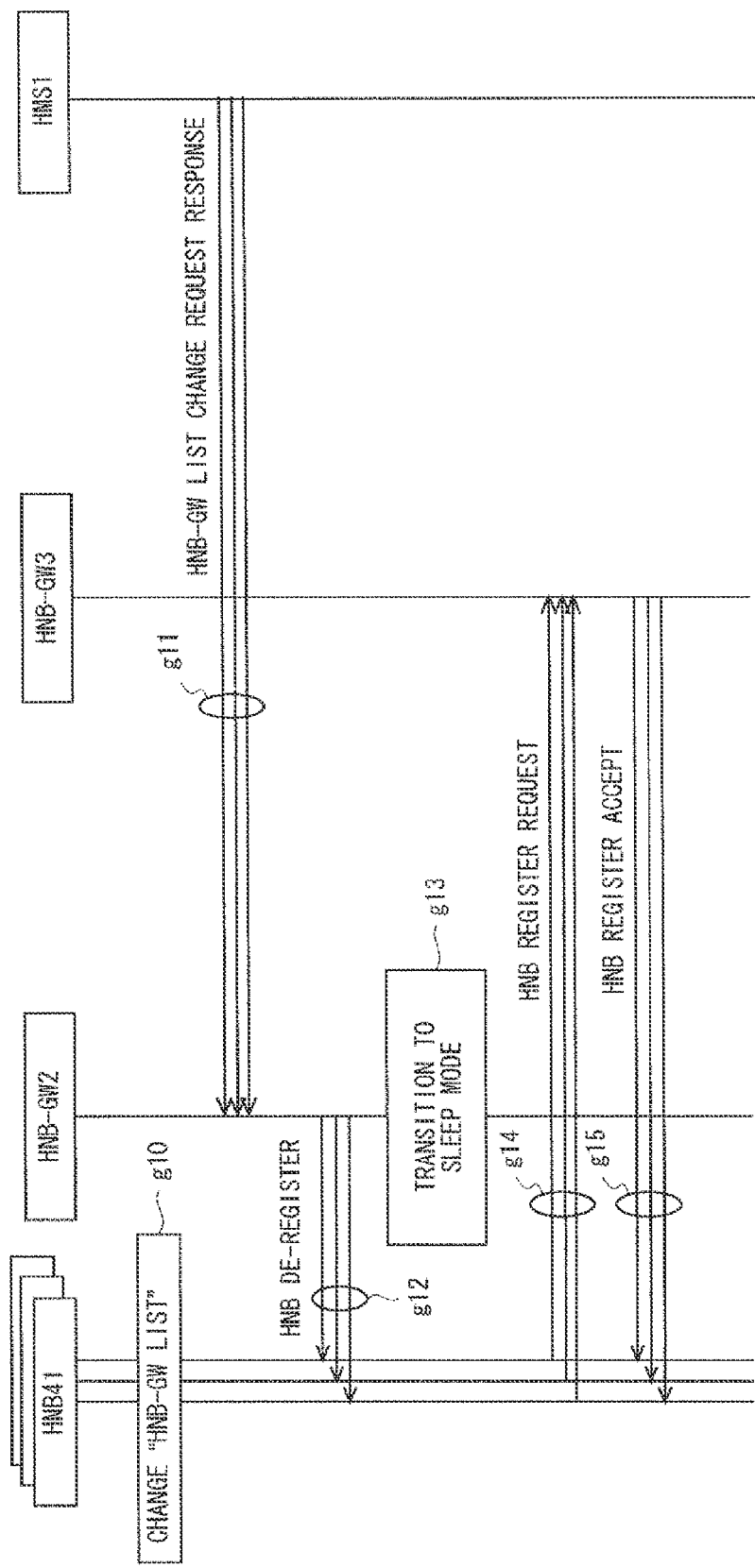
FIG. 13 is a sequence chart showing a transition sequence to the sleep mode in the first exemplary embodiment of the present invention.
Figure 14:
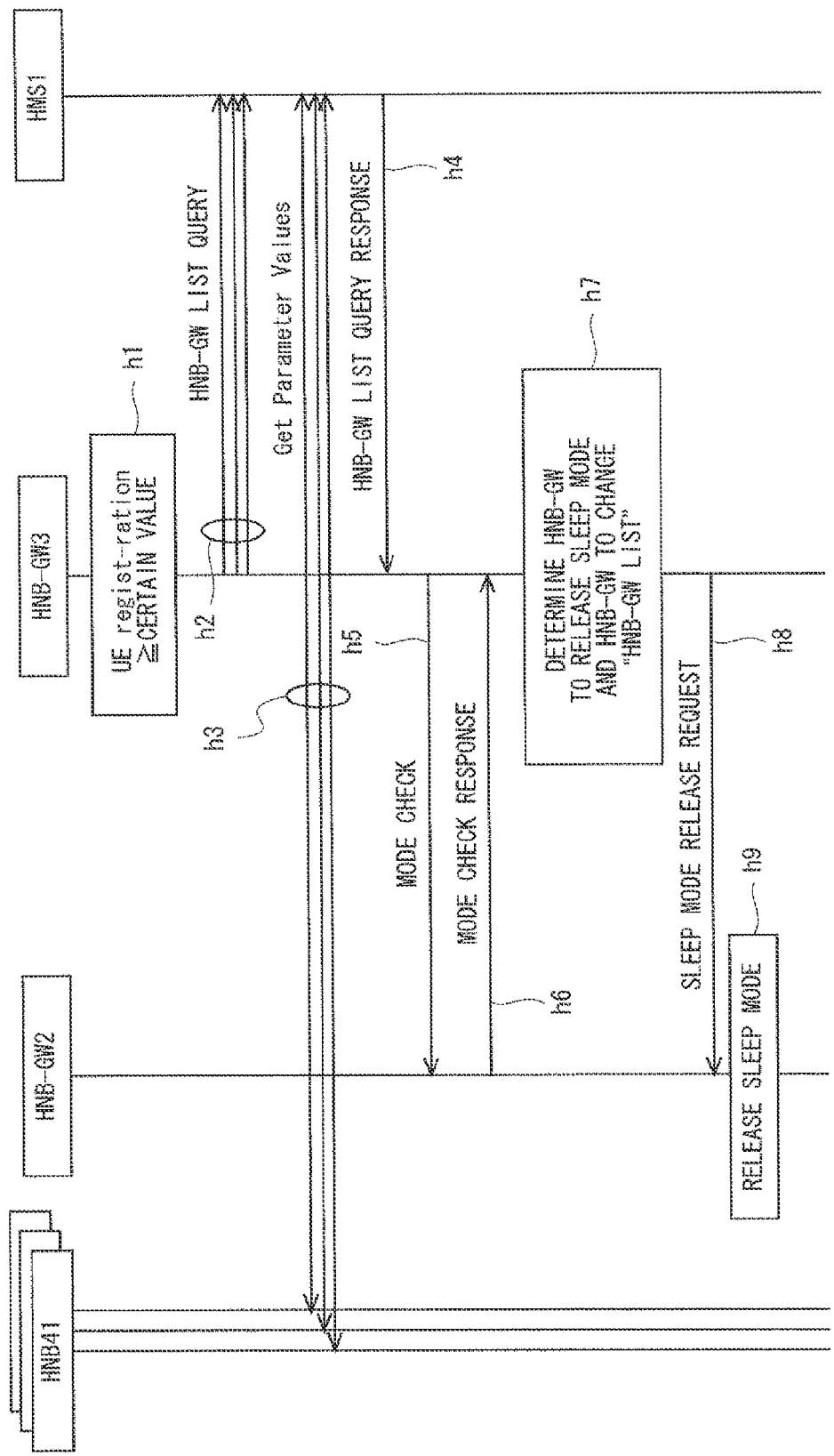
FIG. 14 is a sequence chart showing a transition sequence to a normal mode in the first exemplary embodiment of the present invention.
Figure 15:
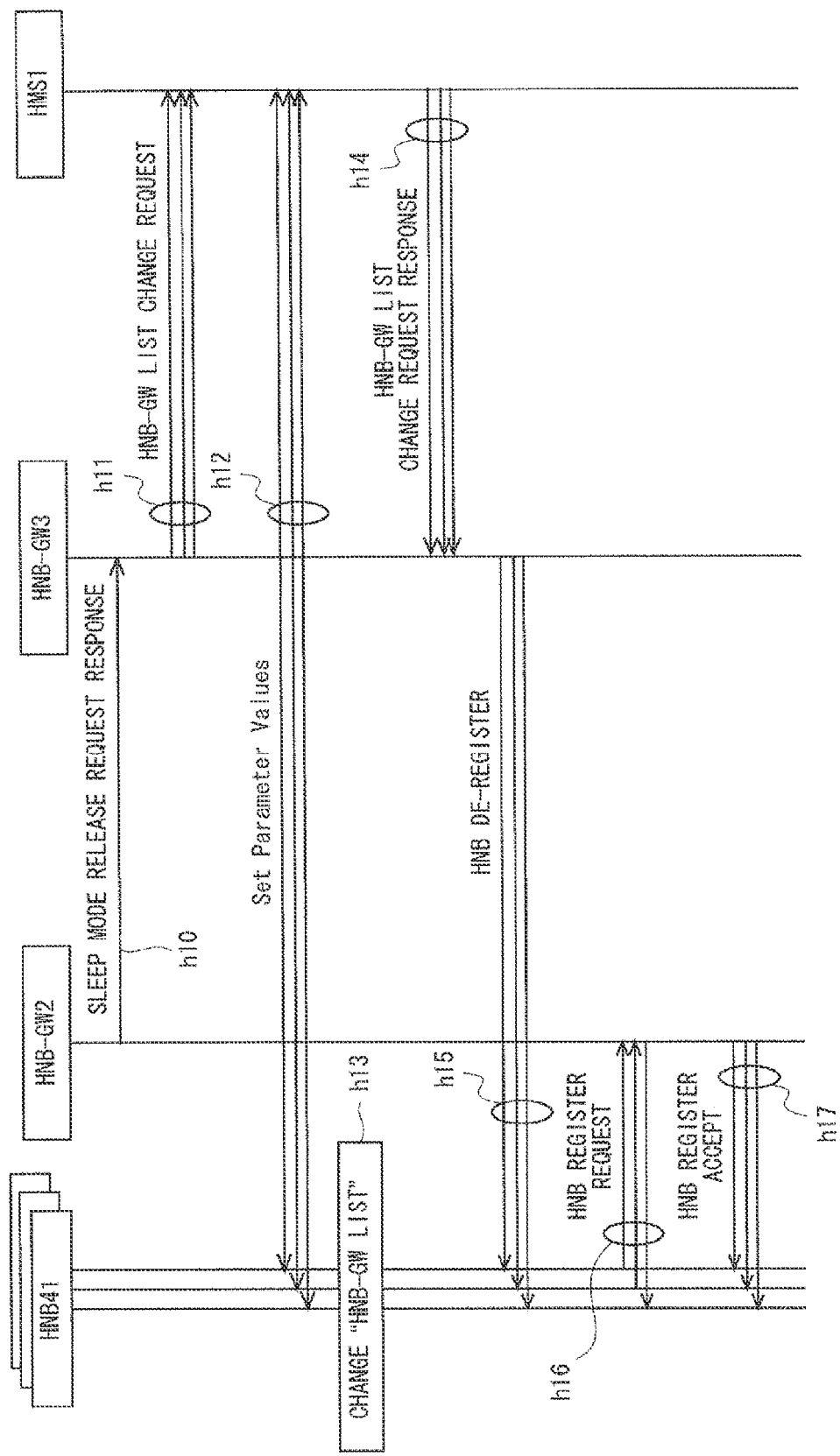
FIG. 15 is a sequence chart showing a transition sequence to the normal mode in the first exemplary embodiment of the present invention.

FIGS. 12 and 13 are sequence charts showing transition sequences to the sleep mode in the first exemplary embodiment of the present invention. FIGS. 14 and 15 are sequence charts showing transition sequences to the normal mode in the first exemplary embodiment of the present invention.

An operation of the femtocell system according to the first exemplary embodiment of the present invention will be explained with reference to FIGS. 1 to 15. Note that the following explanation in this exemplary embodiment will omit the explanation for function units associated with the standard operations described in the above non patent literatures 1 to 3 and the like.

First, an explanation for a method of managing the "HNB list" by the HNB-GW 2 is presented. Updating the "HNB list" is performed by the HNB-GW 2 during the HNB Registration procedure, which is performed when the HNB 41 starts a service, and during the HNB De-Registration procedure, which is performed when the HNB 41 ends the service.

The HNB Registration procedure and the HNB De-Registration procedure are standard operations defined in above non patent literature 1. An update method of the "HNB list" during the HNB Registration procedure is explained with reference to FIG. 6.

When the HNB 41 enters a state ready for the HNB Registration by a condition change such as powering up the HNB 41, the HNB 41 selects the HNB-GW with the highest priority (HNB-GW 2 in this example) in the previously configured "HNB-GW list", and transmits an HNBAP:HNB REGISTER REQUEST message to the HNB-GW 2 (procedures a1 and a1 of FIG. 6).

When the HNB-GW 2 can accept the HNB Registration from the HNB 41, the HNB-GW 2 transmits an HNBAP: HNB REGISTER ACCEPT message to the HNB 41 (procedure a3 of FIG. 6). In the HNB-GW 2, the HNB list management unit 23 adds the HNB 41 to the "HNB list" (see FIG. 4) (procedure a4 of FIG. 6).

Next, an update method of the "HNB list" during the HNB De-Registration (HNB oriented) procedure is explained with reference to FIG. 7.

When the HNB Registration on the HNB-GW 2 is unable to continue due to a condition change such as a configuration change in the HNB 41, the HNB 41 transmits an HNBAP: HNB DE-REGISTER message to the HNB-GW 2 (procedures b1 and b2 of FIG. 7). In the HNB-GW 2, the HNB list management unit 23 deletes the HNB 41 from the "HNB list" (procedure b3 of FIG. 7).

Further, an update method of the "HNB list" during the HNB De-Registration (HNB-GW oriented) is explained with reference to FIG. 8.

When the HNB Registration from the HNB 41 is unable to continue due to a condition change such as a configuration change in the HNB-GW 2, the HNB-GW 2 transmits the HNBAP:HNB DE-REGISTER message to the HNB 41 (procedures c1 and c2 of FIG. 8). In the HNB-GW 2, the HNB list management unit 23 deletes the HNB 41 from the "HNB list" (procedure c3 of FIG. 8).

The HNB list management unit 23 manages the "HNB list" in the HNB-GW 2 as described above.

Next, a method of managing the "UE list" by the HNB-GW 2 is explained. The HNB-GW 2 updates the "UE list" during the UE Registration procedure, which is used when the UE 411 starts using a service in the femtocell system, and during the UE De-Registration procedure, which is used when the UE 411 ends the service in the femtocell system. The UE Registration procedure and the UE De-Registration procedure are standard operations defined in above non patent literature 1.

An update method of the "UE list" during the UE Registration procedure is explained with reference to FIG. 9.

When the HNB 41 detects that the UE 411 camps on the serving area of the HNB 41, the HNB 41 transmits an HNBAP:UE REGISTER REQUEST message to the HNB-GW 2 (procedures d1 and d2 of FIG. 9).

When the HNB-GW 2 can accept the UE Registration from the UE 411, the HNB-GW 2 transmits an HNBAP:UE REGISTER ACCEPT message to the HNB 41 (procedure d3 of FIG. 9). In the HNB-GW 2, the UE list management unit 22 adds the UE 411 to the "UE list" (see FIG. 5) (procedure d4 of FIG. 9).

An update method of the "UE list" during the UE De-Registration (HNB oriented) procedure is explained with reference to FIG. 10.

When the UE Registration of the UE 411 is unable to continue due to a condition change such as a configuration change in the HNB 41, the HNB 41 transmits an HNBAP:UE DE-REGISTER message to the HNB-GW 2 (procedures e1 and e2 of FIG. 10). In the HNB-GW 2, the UE list management unit 22 deletes the UE 411 from the "UE list" (procedure e3 of FIG. 10).

An update method of the "UE list" during the "UE De-Registration (HNB-GW oriented) procedure is explained with reference to FIG. 11.

When the UE Registration of the UE 411 is unable to continue due to a condition change such as a configuration change in the HNB-GW 2, the HNB-GW 2 transmits the HNBAP:UE DE-REGISTER message to the HNB 41 (procedures f1 and f2 of FIG. 11). In the HNBGW 2, the UE list management unit 22 deletes the UE 411 from the "UE list" (procedure f3 of FIG. 11).

The UE list management unit 22 manages the "UE list" in the HNB-GW 2 as described above.

Next, an operation of transitioning from the state where both HNB-GW 2 and the HNB-GW 3 operate in the normal mode to the state where the HNB-GW 2 operates in the sleep mode.

In the HNB-GW 2, when the operation mode control unit 21 detects that the "UE Registration number" in the HNB-GW 2 reaches or falls below a predetermined value as a result of the UE Registration procedure or the UE De-Registration procedure in the HNB-GW 2, the interface unit to HMS 24 transmits the "HNB-GW list query request" message to the HMS 1 in order to obtain the "HNB-GW list" of the HNB 41 (procedures g1 and g2 of FIG. 12).

Although processes from the procedure g2 to the procedure g12 are repeated for all of the HNBs 41-4*x* included in the "HNB list" of the HNB-GW 2 when the HNB-GW 2 transitions to the sleep mode, the following explanation mentions only the HNB 41.

When the HMS1 does not hold the "HNB-GW list" of the HNB 41, the HMS 1 transmits RPC (Remote Procedure Call): Get Parameter Values to the HNB 41 and obtains the "HNB-GW list" (procedure g3 of FIG. 12). Note that the process of the procedure g3 may not be performed when the HMS1 holds the "HNB-GW list" of the HNB 41.

In the HMS1, the interface unit to HNB-GW 11 transmits, to the HNB-GW 2, the "HNB-GW list" together with the "HNB-GW list query response" message (procedure g4 of FIG. 12).

When an HNB-GW other than the HNB-GW 2 (HNB-GW 3 in this example) is included in the "HNB-GW list" of the HNB 41, the operation mode control unit 21 in the HNB-GW 2 continues the procedure g5 and subsequent procedures. When the HNB-GW other than the HNB-GW 2 is not included in the "HNB-GW list" of the HNB 41, the operation mode control unit 21 in the HNB-GW 2 stops transitioning to the sleep mode.

In the HNB-GW 2, the inter-HNB-GW interface unit 25 transmits the "mode check" message to the HNB-GW 3 (procedure g5 of FIG. 12).

In the HNB-GW 3, when the operation mode control unit 31 checks the operation mode of the HNB-GW 3, the inter-HNB-GW interface unit 35 transmits the "mode check response" message to the HNB-GW 2 (procedure g6 of FIG. 12).

When the HNB-GW 3 is operating in the normal mode, the operation mode control unit 21 in the HNB-GW 2 selects the HNB-GW 3 as the HNB-GW that is configured to have the highest priority in the "HNB-GW list" of the HNB 41 in the procedure g8 (procedure g7 of FIG. 12).

When the HNB-GW 3 is operating in the sleep mode, if there is another HNB-GW in the "HNB-GW list" of the HNB 41, the HNB-GW 2 performs the procedures g5 to g7 to the another HNB-GW. If another HNB-GW does not exist in the "HNB-GW list", the operation mode control unit 21 in the HNB-GW 2 stops transitioning to the sleep mode.

In the HNB-GW 2, the interface unit to HMS 24 sets the priority of the HNB-GW 3 to be the highest in the "HNBGW list" of the HNB 41, and transmits the "HNB-GW list change request" message to the HMS 1 (procedure g8 of FIG. 12).

The HMS1 transmits RPC:Set Parameter Values to the HNB 41 (procedure g9 of FIG. 12). The HNB 41 changes the "HNB-GW list" in accordance with an instruction from the HMS1 (procedure g10 of FIG. 13).

In the HMS1, the interface unit to HNB-GW 11 transmits the "HNB-GW list change response" message to the HNB-GW 2 in order to notify that the change in the "HNB-GW list" is completed (procedure g11 of FIG. 13).

The HNB-GW 2 transmits the HNBAP:HNB DE-REGISTER message to the HNB 41 (procedure g12 of FIG. 13). At this time, when the HNB 41 that has received the HNBAP: HNB DE-REGISTER message includes a communicating UE, the communication shall be disconnected.

In the HNB-GW 2, the operation mode control unit 21 makes the HNB-GW 2 transition to the sleep mode (procedure g13 of FIG. 13).

When the HNB-GW 2 receives the HNBAP:HNB RESITER REQUEST message during the operation in the sleep mode, the HNB-GW 2 transmits an HNBAP:HNB REGISTER REJECT and does not accept the HNB Registration. While the HNB-GW 2 is operating in the sleep mode, when the HNB-GW 2 receives the "mode check" message and the "sleep mode release request" message from another HNB-GW 3, the HNB-GW 2 is capable of controlling those messages.

The HNB 41 attempts the HNB Registration again. Since the priority of the HNB-GW 3 is set to be the highest in the "HNB-GW" list in the procedure g10, the HNB 41 transmits the HNBAP:HNB REGISTER REQUEST message to the HNB-GW 3 (procedure g14 of FIG. 13).

The HNB-GW 3 transmits the HNBAP:HNB REGISTER ACCEPT message to the HNB 41 and completes the HNB Registration (procedure g15 of FIG. 13).

When the HNB 41 performs the HNB Registration on the HNB-GW 3, it is necessary to connect to a different HMS depending on a network configuration, however the connection between the HNB and the HMS is not directly related to the present invention. Therefore, this exemplary embodiment assumes that the same HMS 1 can be used for the case when the HNB 41 is performing the HNB Registration on the HNB-GW 2 and the case when the HNB 41 is performing the HNB Registration on the HNB-GW 3.

The HNB-GW 2 transitions to the sleep mode as described above.

Next, an explanation is given for the operation of transitioning from the state where the HNB-GW 2 is operating in the sleep mode and the HNB-GW 3 is operating in the normal mode to the state where the HNB-GW 2 transitions to the normal mode.

In the HNB-GW 3, when the operation mode control unit 31 detects that the "UE Registration number" in the HNB-GW 3 reaches or exceeds a predetermined value as a result of the UE Registration procedure or the UE De-Registration procedure in the HNB-GW 3, the interface unit to HMS 34 transmits the "HNB-GW list query request" message to the HMS 1 in order to obtain the "HNB-GW list" of the HNB 41 (procedures h1 and h2 of FIG. 14).

Although the processes from the procedure h2 to the procedure h6 are repeated for all of the HNBs included in the "HNB list" of the HNB-GW 3, the following explanation mentions only the HNB 41.

When the HMS1 does not hold the "HNB-GW list" of the HNB 41, the HMS 1 transmits the RPC:Get Parameter Values to the HNB 41 and obtains the "HNB-GW list" (procedure g3 of FIG. 14). Note that the process of the procedure h3 may not be performed when the HMS 1 holds the "HNB-GW list" of the HNB 41.

In the HMS 1, the interface unit to HNB-GW 11 transmits the "HNB-GW list" together with the "HNB-GW list query response" message to the HNB-GW 3 (procedure g4 of FIG. 12).

When an HNB-GW other than the HNB-GW 3 (HNB-GW 2 in this example) is included in the "HNB-GW list" of the HNB 41, the HNB-GW 3 continues the procedure h5 and subsequent procedures.

In the HNB-GW 3, the inter-HNB-GW interface unit 35 transmits the "mode check" message to the HNB-GW (HNB-GW 2 in this example) that is included in the "HNB-GW list" obtained in the process of the procedure h4 (procedure h5 of FIG. 14).

In the HNB-GW 2, when the operation mode control unit 21 checks the operation mode of the HNB-GW 2, the inter-HNB-GW interface unit 25 transmits the "mode check response" message to the HNB-GW 3 (procedure h6 of FIG. 14).

In the HNB-GW 3, the operation mode control unit 31 selects one of the HNB-GWs operating in the sleep mode (HNB-GW 2 in this example). Moreover, the operation mode control unit 31 selects all or a part of the HNBs having the HNB-GW 2 in their "HNB-GW lists" as the HNBs with a change in their "HNB-GW lists" (procedure h7 of FIG. 14).

Although the processes from the procedure h11 to the procedure h17 are repeated for all of the HNBs selected in the procedure h7, the following explanation mentions only the HNB 41.

In the HNB-GW 3, the inter-HNB-GW interface unit 35 transmits the "sleep mode release request" message to the HNB-GW 2 (procedure h8 of FIG. 14).

In the HNB-GW 2, the operation mode control unit 21 makes the HNB-GW 2 transition to the normal mode. After that, the HNB-GW 2 can accept the HNB Registration when the HNB-GW 2 receives the HNBAP:HNB RESITER REQUEST message (procedure h9 of FIG. 14).

In the HNB-GW 2, the inter-HNB-GW interface unit 25 transmits the "sleep mode release response" message to the HNB-GW 3 (procedure h10 of FIG. 15).

In the HNB-GW 3, the interface unit to HMS 34 sets the priority of the HNB-GW 2 to be the highest in the "HNBGW list" of the HNB 41, and transmits the "HNB-GW list change request" message to the HMS 1 (procedure h11 of FIG. 15).

The HMS1 transmits the RPC:Set Parameter Values to the HNB 41 (procedure h12 of FIG. 15). The HNB 41 changes the "HNB-GW list" in accordance with the instruction from the HMS1 (procedure h13 of FIG. 15).

In the HMS1, the interface unit to HNB-GW 11 transmits the "HNB-GW list change response" message to the HNB-GW 3 in order to notify that the change in the "HNB-GW list" is completed (procedure g14 of FIG. 15).

The HNB-GW 3 transmits the HNBAP:HNB DE-REGISTER message to the HNB 41 (procedure h15 of FIG. 15). The HNB 41 attempts the HNB Registration again. Since the priority of the HNB-GW 2 is set to be the highest in the "HNB-GW list" in the procedure h13, the HNB 41 transmits the HNBAP:HNB REGISTER REQUEST message to the HNB-GW 2 (procedure h16 of FIG. 15).

The HNB-GW 2 transmits the HNBAP:HNB REGISTER ACCEPT message to the HNB 41 and completes the HNB Registration (procedure h17 of FIG. 15).

The HNB-GW 2 transitions to the normal mode as described above.

In this way, this exemplary embodiment enables the transition of the HNBGWs 2 and 3 to the sleep mode when the usage rates of the HNB-GW 2 and 3 are low. During the operation in the sleep mode, it is possible to deactivates the function units other than the function units associated with the "mode check" message and the "sleep release request" message from other HNB-GWs, thereby enabling power saving operation.

Although basic configurations and procedures of the second exemplary embodiment of the present invention are similar to those in the above first exemplary embodiment of the present invention, the second exemplary embodiment has an additional twist to the "mode check response" message from the HNB-GW 3 used when the HNB-GW 2 transitions to the sleep mode. An operation of this exemplary embodiment will be explained with reference to FIG. 12. A modification in this exemplary embodiment is in processes of the procedures g6 and g7.

In addition to the operation mode of the HNB-GW 3, the HNB-GW 3 transmits the "UE registration number" of the HNB-GW 3 to the HNB-GW 2 by the "mode check response" message (procedure g6 of FIG. 12).

When the HNB-GW 3 is operating in the normal mode, and when the "UE registration number" of the HNB-GW 3 is less than or equal to the predetermined value, in the procedure g8, the HNB-GW 3 is selected as the HNB-GW to be configured to have the highest priority in the "HNB-GW list" of the HNB 41 (procedure g7 of FIG. 12).

In the case the HNB-GW 3 is not operating in the normal mode or the case the "UE registration number" of the HNB-GW 3 exceeds the predetermined value, when there is another HNB-GW in the "HNB-GW list", the HNB-GW 2 performs the operation from the procedure g5 to the procedure g7 to the another HNB-GW. When there is another HNB-GW in the "HNB-GW list", the HNB-GW 2 stops transitioning to the sleep mode.

As stated above, this exemplary embodiment takes into consideration the usage rate of the other HNB-GW 3 before transitioning to the sleep mode, thereby making it possible to avoid a sharp increase in the usage rate of the other HNB-GW 3.

Although basic configurations and procedures of the third exemplary embodiment of the present invention are similar to those in the above first exemplary embodiment of the present invention, the third exemplary embodiment has an additional twist to the transmission timing of the HNBAP:HNB DE-REGISTER message.

Figure 16:
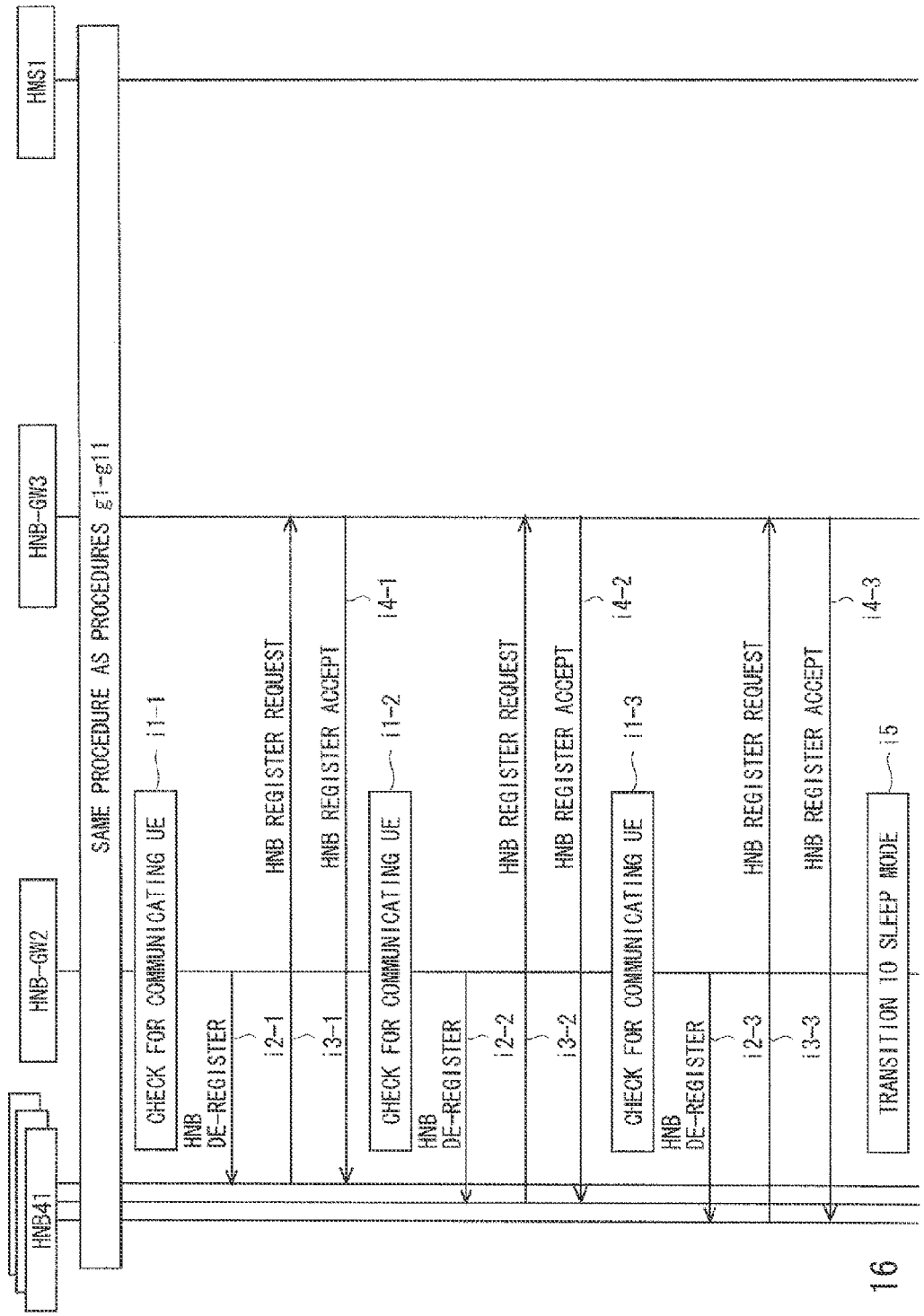
FIG. 16 is a sequence chart showing an operation of a femtocell system according to a third exemplary embodiment of the present invention.

FIG. 16 is a sequence chart showing an operation of a femtocell system according to the third exemplary embodiment of the present invention. FIG. 16 shows an operation after the processes from the procedures g1 to g11 shown in FIGS. 12 and 13. An operation of the femtocell system according to the third exemplary embodiment of the present invention is explained with reference to FIG. 16.

The HNB-GW 2 checks whether there is any communicating UE via the HNB-GW 2. The HNB-GW 2 further checks which HNB the UE is communicating therethrough. After that, the HNB-GW 2 does not allow the UE to initiate new communication (procedure i1-1 of FIG. 16).

The HNB-GW 2 transmits the HNBAP:HNB DE-REGISTER message to all the HNBs not having a communicating UE (the HNBs 41 to 43 in this example) (procedure i2-1 of FIG. 16).

The HNB 41, which has received the HNBAP:HNB DE-REGISTER message, transmits the HNBAP:HNB REGISTER REQUEST message to the HNB-GW 3 (procedure i3-1 of FIG. 16).

The HNB-GW 3 transmits the HNBAP:HNB REGISTER ACCEPT message to the HNB 41 (procedure i4-1 of FIG. 16).

When the communication of the UE ends and the HNB no longer has a communicating UE, the HNB-GW 2 transmits the HNBAP:HNB DE-REGISTER message [procedures i1-2 and i2-2 of FIG. 16 (same as procedures i1-3 and i2-3)].

The HNB 41, which has received the HNBAP:HNB DE-REGISTER message, transmits the HNBAP:HNB REGISTER REQUEST message to the HNB-GW 3 [procedure i3-2 of FIG. 16 (same as procedure i3-3)].

The HNB-GW 3 transmits the HNBAP:HNB REGISTER ACCEPT message to the corresponding HNB 41 [procedure i4-2 of FIG. 16 (same as procedure i4-3)]

The HNB-GW 2 transitions to the sleep mode after transmitting the HNBAP:HNB DE-REGISTER message to all the HNBs (the HNBs 41 to 13 in this example) included in the "HNB list" of the HNB-GW 3 (procedure of FIG. 16).

As stated above, in this exemplary embodiment, since the HNB-GW transitions to the sleep mode after waiting for the communicating UE to end the communication, the HNB-GW can transition to the sleep mode without disconnecting the communication of the UE. However, when the UE continues the communication after a predetermined time, the HNB-GW may be forced to transition to the sleep mode.

Although the basic configurations and procedures of a fourth exemplary embodiment of the present invention are similar to those in the above first exemplary embodiment of the present invention, in the fourth exemplary embodiment, CPU (Central Processing Unit) utilization of the HNB-GW can be used as the index representing the usage rate of the HNB-GW by making necessary changes such as providing a function to manage the CPU utilization of the HNB-GW instead of providing the HNB-GW with the function to manage UEs that are registered in the UE Registration.

Although the basic configuration and the procedure of a fifth exemplary embodiment of the present invention are similar to those in the above first exemplary embodiment, Data Volume that passes through the HNB-GW per unit of time can be used as the index representing the usage rate of the HNB-GW by making necessary changes such as providing a function to monitor the Data Volume that passes through the HNB-GW per unit of time instead of providing the HNB-GW with the function to manage UEs that are registered in the UE Registration.

The abovementioned fourth exemplary embodiment of the present invention and the fifth exemplary embodiment of the present invention cannot be carried out at the same time. However, other exemplary embodiments can be carried out in combination.

Note that it is obvious that the present invention is not limited by above exemplary embodiments, but various modifications can be made by a person skilled in the art based on the description of claims.

The present application claims priority rights of and is based on Japanese Patent Application No. 2011-063458 filed on Mar. 23, 2011 in the Japanese Patent Office, the entire contents of which are hereby incorporated by reference.

INDUSTRIAL APPLICABILITY

The present invention is applied to an HNB gateway device, a femtocell system, and a method of operating an HNB-GW used for same with reduced electric power, and particularly to a power saving operation of an HNB (Home Node B)-GW (Gateway) that forms the femtocell system.

REFERENCE SIGNS LIST

1 HMS
2,3 HNB-GW
11 INTERFACE UNIT TO HNB-GW
21 OPERATION MODE CONTROL UNIT
22 UE LIST MANAGEMENT UNIT
23 HNB LIST MANAGEMENT UNIT
24 INTERFACE UNIT TO HMS
25 INTER-HNB-GW INTERFACE UNIT
41-4$x$, 51-5$y$ HNB
411-41$a$, 4$x$1-4$xb$ UE

The invention claimed is:

1. A Home Node B gateway device (HNB-GW) including a function to obtain a usage rate of the HNB-GW, relaying signals between a switching center and a Home Node B (HNB), and transitioning to a sleep mode when the usage rate of the HNB-GW reaches or falls below a predetermined value, the HNB-GW comprising:
 a unit configured to change, upon transition to the sleep mode, an HNB-GW list in the HNB performing HNB registration on the HNB-GW using RPC:SetParameterValues from a Home Node B Management System (HMS); and
 an inter-HNB-GW interface,
 wherein the unit is further configured to select a different HNB-GW operating in a normal mode, and instruct, using the RPC:SetParameterValues, the HNB to set a priority of the different HNB-GW to be the highest in the HNB-GW list,
 wherein the inter-HNB-GW interface is configured to transmit a mode check message, receive a mode check response message, receive a sleep mode release request message, and transmit a sleep mode release request response message to and from the different HNB-GW, and
 wherein the HNB gateway device is configured to notify and manage an operation mode and the usage rate mutually with the different HNB-GW via the inter-HNB GW interface.

2. The HNB-GW according to claim 1, wherein the HNB-GW is further configured to obtain and modify the HNB-GW list in the HNB via an interface to the HMS for transmitting an HNB-GW list query request message, receiving an HNB-GW list query request response message, transmitting an HNB-GW list change request message, and receiving an HNB-GW list change request response message to and from the HMS.

3. The HNB-GW according to claim 1, wherein, upon transition to the sleep mode, the HNB-GW is further configured to check whether there is a communicating User Equipment (UE) and to transmit an HNBAP:HNB DE-REGISTER message to the HNB having no communicating UE.

4. A method of operating a Home Node B gateway device (HNB-GW) with reduced electric power, the HNB-GW including a function to obtain a usage rate of the HNB-GW, relaying signals between a switching center and a Home Node B (HNB), and transitioning to a sleep mode when the usage rate of the HNB-GW reaches or falls below a predetermined value, the method comprising:

executing a process to change, upon transition to the sleep mode, an HNB-GW list in the HNB performing HNB registration on the HNB-GW using RPC:SetParameterValues from a Home Node B Management System (HMS), the executing the process comprising:

selecting a different HNB-GW operating in a normal mode, and instructing, using the RPC:SetParameterValues, the HNB to set a priority of the different HNB-GW to be the highest in the HNB-GW list; and notifying and managing an operation mode and the usage rate mutually between the HNB-GW and the different HNB-GW via an inter-HNB-GW interface for transmitting a mode check message, receiving a mode check response message, receiving a sleep mode release request message, and transmitting a sleep mode release request response message to and from the different HNB-GW.

5. The method according to claim 4, further comprising:
obtaining and modifying the HNB-GW list held to the HNB via an interface to the HMS for transmitting an HNB-GW list query request message, receiving an HNB-GW list query request response message, transmitting an HNB-GW list change request message, and receiving an HNB-GW list change request response message to and from the HMS.

6. The method according to claim 4, further comprising:
checking, upon transition to the sleep mode, whether there is a communicating User Equipment (UE) and transmitting an HNBAP:HNB DE-REGISTER message to the HNB having no communicating UE.

* * * * *